(12) United States Patent
Barnard

(10) Patent No.: US 10,943,577 B2
(45) Date of Patent: Mar. 9, 2021

(54) SOLID-STATE TRANSDUCER, SYSTEM, AND METHOD

(71) Applicant: MICHIGAN TECHNOLOGICAL UNIVERSITY, Houghton, MI (US)

(72) Inventor: Andrew Robert Barnard, Houghton, MI (US)

(73) Assignee: MICHIGAN TECHNOLOGICAL UNIVERSITY, Houghton, MI (US)

(*) Notice: Subject to any disclaimer, the term of this patent is extended or adjusted under 35 U.S.C. 154(b) by 70 days.

(21) Appl. No.: 16/473,998

(22) PCT Filed: Jan. 2, 2018

(86) PCT No.: PCT/US2018/012061
§ 371 (c)(1),
(2) Date: Jun. 26, 2019

(87) PCT Pub. No.: WO2018/128980
PCT Pub. Date: Jul. 12, 2018

(65) Prior Publication Data
US 2020/0410973 A1    Dec. 31, 2020

Related U.S. Application Data

(60) Provisional application No. 62/441,734, filed on Jan. 3, 2017.

(51) Int. Cl.
*G10K 11/178* (2006.01)
*G10K 11/16* (2006.01)
*H04R 23/00* (2006.01)

(52) U.S. Cl.
CPC ........ *G10K 11/1785* (2018.01); *G10K 11/161* (2013.01); *G10K 11/17873* (2018.01);
(Continued)

(58) Field of Classification Search
CPC ........ G10K 11/1785; G10K 11/17873; G10K 11/161; G10K 2210/12822;
(Continued)

(56) References Cited

U.S. PATENT DOCUMENTS 5,870,482 A    2/1999    Loeppert et al.
8,379,899 B2 *  2/2013    Van Halteren ......... H04R 11/04
                                                     381/352
(Continued)

OTHER PUBLICATIONS

International Preliminary Report on Patentability for Application No. PCT/US2018/012061 dated Jul. 18, 2019 (9 pages).
(Continued)

*Primary Examiner* — David L Ton
(74) *Attorney, Agent, or Firm* — Michael Best & Friedrich LLP

(57) ABSTRACT

The present disclosure includes solid-state transducers, a system, and a method. In one embodiment, a solid-state transducer includes a housing, a first end portion, a second end portion, a plurality of electrical conductors, and a thin-film resistive material. The thin-film resistive material is disposed between and in electrical communication with a plurality of electrical conductors. The thin-film resistive material is configured to receive one or more electrical signals from the plurality of electrical conductors, and generate thermal oscillations to create pressure waves in a medium in response to receiving the one or more electrical signals.

20 Claims, 16 Drawing Sheets

(52) U.S. Cl.
CPC . *H04R 23/006* (2013.01); *G10K 2210/12822* (2013.01); *G10K 2210/3027* (2013.01); *G10K 2210/3212* (2013.01)

(58) Field of Classification Search
CPC ... G10K 2210/3027; G10K 2210/3212; H04R 23/006
USPC .................................... 381/351, 164, 179
See application file for complete search history.

(56) References Cited

U.S. PATENT DOCUMENTS

| | | |
|---|---|---|
| 2002/0102004 A1 | 8/2002 | Minervini |
| 2011/0274297 A1 | 11/2011 | Wang et al. |
| 2012/0230848 A1 | 9/2012 | McQuary et al. |
| 2013/0129133 A1 | 5/2013 | Inoda et al. |
| 2014/0334633 A1* | 11/2014 | Krueger ............... G10K 13/00 381/71.4 |
| 2015/0020762 A1* | 1/2015 | Peitz .................. F01N 1/065 123/184.53 |
| 2017/0294181 A1* | 10/2017 | Koch ............. G10K 11/17857 |
| 2020/0279547 A1* | 9/2020 | Christoph ......... G10K 11/1785 |

OTHER PUBLICATIONS

International Search Report and Written Opinion mailed in International Patent Application No. PCT/US2018/012061 (dated Mar. 26, 2018).

\* cited by examiner

Input Voltage: 20 V

Resistance of Solid-State Transducer: 1.53Ω

Input Power: ~270 W

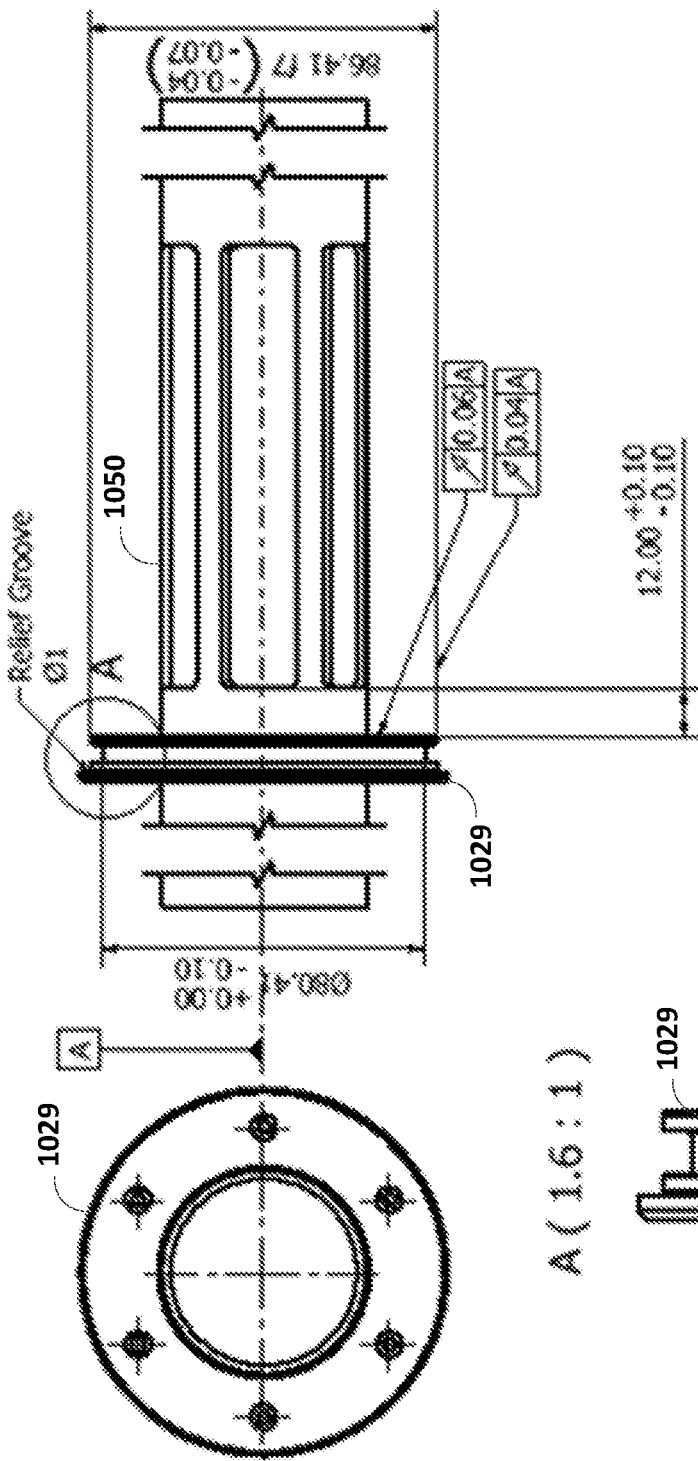
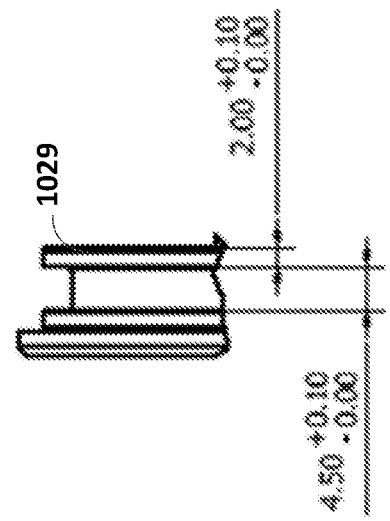
FIG. 16A
FIG. 16B
FIG. 16C

SOLID-STATE TRANSDUCER, SYSTEM, AND METHOD

CROSS-REFERENCE TO RELATED APPLICATION(S)

This application is a U.S. national stage entry of International Patent Application No. PCT/US2018/012061, filed on Jan. 2, 2018, which claims the benefit of U.S. Provisional Patent Application No. 62/441,734, filed on Jan. 3, 2017, the entire contents of each of which are fully incorporated herein by reference.

BACKGROUND

The present disclosure relates to an active noise control system for a fluid-flow system, for example, an active noise reduction system for an exhaust gas system.

Fluid-flow systems produce noise when discharging fluid from the fluid-flow system and transmit noise from noise sources attached to the fluid-flow systems. Different techniques and noise reduction systems are used to reduce the noise traveling through the fluid-flow system. For example, a conventional muffler system reduces the noise produced by an internal combustion engine. In another instance, military ground and marine vehicles often have a "low noise" mode of operation to reduce the risk of detection.

Active Noise Control (ANC) techniques have proven successful for reducing the noise produced by fluid-flow systems in a lab environment. However, the conventional ANC systems are large, complicated, heavy, and have many moving parts that increase the likelihood of failure.

SUMMARY

The solid-state transducer of the present disclosure provides a solution for reducing noise of a fluid-flow system, for example, the noise produced by an internal combustion engine. The solid-state transducer of the present disclosure also provides a solution for reducing the noise produced by any fluid (gaseous or liquid) flow systems (e.g., vehicles, heating, ventilation, and air condition (HVAC) system, hairdryers, power plant cooling systems, or any other suitable system having a noise source connected to and in communication with a pipe or duct sound path). Additionally, the solid-state transducer of the present disclosure also may be used to as part of an Active Noise Shaping (ANS) solution for altering the noise produced by any of the above-noted fluid (gaseous or liquid) flow systems.

In the present disclosure, an active noise control system includes a solid state transducer with advanced thin-film materials, such as an array of carbon nanotube wires, porous carbon foams, freestanding graphene, graphene on a substrate, an array of metal nanowires, nanoscale thickness metal films, conductive polymer thin films, boron nitride nanotubes, or a combination thereof.

The solid-state transducer (also referred to as, an electroacoustic transducer, a loudspeaker, or a thermophone) produces sound by rapidly heating and cooling surrounding air particles to generate pressure waves with no material motion. The pressure waves that are generated propagate as either simple plane waves, higher order propagating wave modes, or both.

The solid-state transducer is lightweight, resistant to high temperatures, flexible, and stretchable. One of many applications of the present disclosure is to use a tuned acoustic chamber and a solid-state transducer to form an active noise control system in line with an exhaust system of a vehicle. The active noise control system of the present disclosure has a small size, low weight, no-moving-parts, and provides very low or no backpressure to the fluid-flow system.

In one embodiment of the present disclosure, a solid-state transducer includes a housing, a first end portion, a second end portion, a plurality of electrical conductors, and a thin-film resistive material. The housing of the solid-state transducer has a first end and a second end and defines an aperture between the first end and the second end. The first end portion positioned at the first end of the housing, the first end portion defining a first main aperture and a first plurality of apertures. The second end portion positioned at the second end of the housing, the second end portion defining a second main aperture and a second plurality of apertures. A first group of the plurality of electrical conductors is within and extends from one of the first plurality of apertures to the second end portion. A second group of the plurality of electrical conductors is within and extends from one of the second plurality of apertures to the first end portion. The thin-film resistive material is disposed between and in electrical communication with the plurality of electrical conductors. The thin-film resistive material is configured to receive one or more electrical signals from the plurality of electrical conductors, and generate thermal oscillations to create pressure waves in a medium in response to receiving the one or more electrical signals.

In another embodiment of the present disclosure, a system includes an audio amplifier and a solid-state transducer. The audio amplifier is configured to generate one or more electrical signals. The solid-state transducer includes a housing, a first end portion, a second end portion, a plurality of electrical conductors, and a thin-film resistive material. The housing of the solid-state transducer has a first end and a second end and defines an aperture between the first end and the second end. The first end portion positioned at the first end of the housing, the first end portion defining a first main aperture and a first plurality of apertures. The second end portion positioned at the second end of the housing, the second end portion defining a second main aperture and a second plurality of apertures. A first group of the plurality of electrical conductors is within and extends from one of the first plurality of apertures to the second end portion. A second group of the plurality of electrical conductors is within and extends from one of the second plurality of apertures to the first end portion. The thin-film resistive material is disposed between and in electrical communication with the plurality of electrical conductors. The thin-film resistive material is configured to receive one or more electrical signals from the plurality of electrical conductors, and generate thermal oscillations to create pressure waves in a medium in response to receiving the one or more electrical signals.

In yet another embodiment of the present disclosure, a method includes generating, with an audio amplifier, one or more electrical signals, receiving, with a plurality of electrical conductors of a solid-state transducer, the one or more electrical signals from the audio amplifier, receiving, with a thin-film resistive material of the solid-state transducer, the one or more electrical signals from the plurality of electrical conductors, and generating, with the thin-film resistive material, thermal oscillations to create pressure waves in a medium in response to receiving the one or more electrical signals. The solid-state transducer in the method 900 includes a housing, a first end portion, a second end portion, a plurality of electrical conductors, and a thin-film resistive material. The housing of the solid-state transducer has a first end and a second end and defines an aperture between the first end and the second end. The first end portion positioned at the first end of the housing, the first end portion defining a first main aperture and a first plurality of apertures. The second end portion positioned at the second end of the housing, the second end portion defining a second main aperture and a second plurality of apertures. A first group of the plurality of electrical conductors is within and extends from one of the first plurality of apertures to the second end portion. A second group of the plurality of electrical conductors is within and extends from one of the second plurality of apertures to the first end portion. The thin-film resistive material is disposed between and in electrical communication with the plurality of electrical conductors. The thin-film resistive material is configured to receive one or more electrical signals from the plurality of electrical conductors, and generate thermal oscillations to create pressure waves in a medium in response to receiving the one or more electrical signals.

Other aspects of the present disclosure will become apparent by consideration of the detailed description and accompanying drawings.

BRIEF DESCRIPTION OF THE DRAWINGS

FIG. 16A is a perspective view of an end cap in the first end portion welded to the slotted pipe.

FIG. 16B is a cross-section view of the end cap in the first end portion illustrating the O-ring grooves for sealing the chamber.

FIG. 16C is a perspective view of the end cap in the first end portion welded to the slotted pipe.

DETAILED DESCRIPTION

Before any embodiments of the present disclosure are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways. Also, it is to be understood that the phraseology and terminology used herein is for the purpose of description and should not be regarded as limiting.

Although directional references, such as upper, lower, downward, upward, rearward, bottom, front, rear, etc., may be made herein in describing the drawings, these references are made relative to the drawings (as normally viewed) for convenience. These directions are not intended to be taken literally. In addition, terms such as "first", "second", and "third" are used herein for purposes of description or distinction and are not necessarily intended to indicate or imply relative importance or order.

Figure 1:
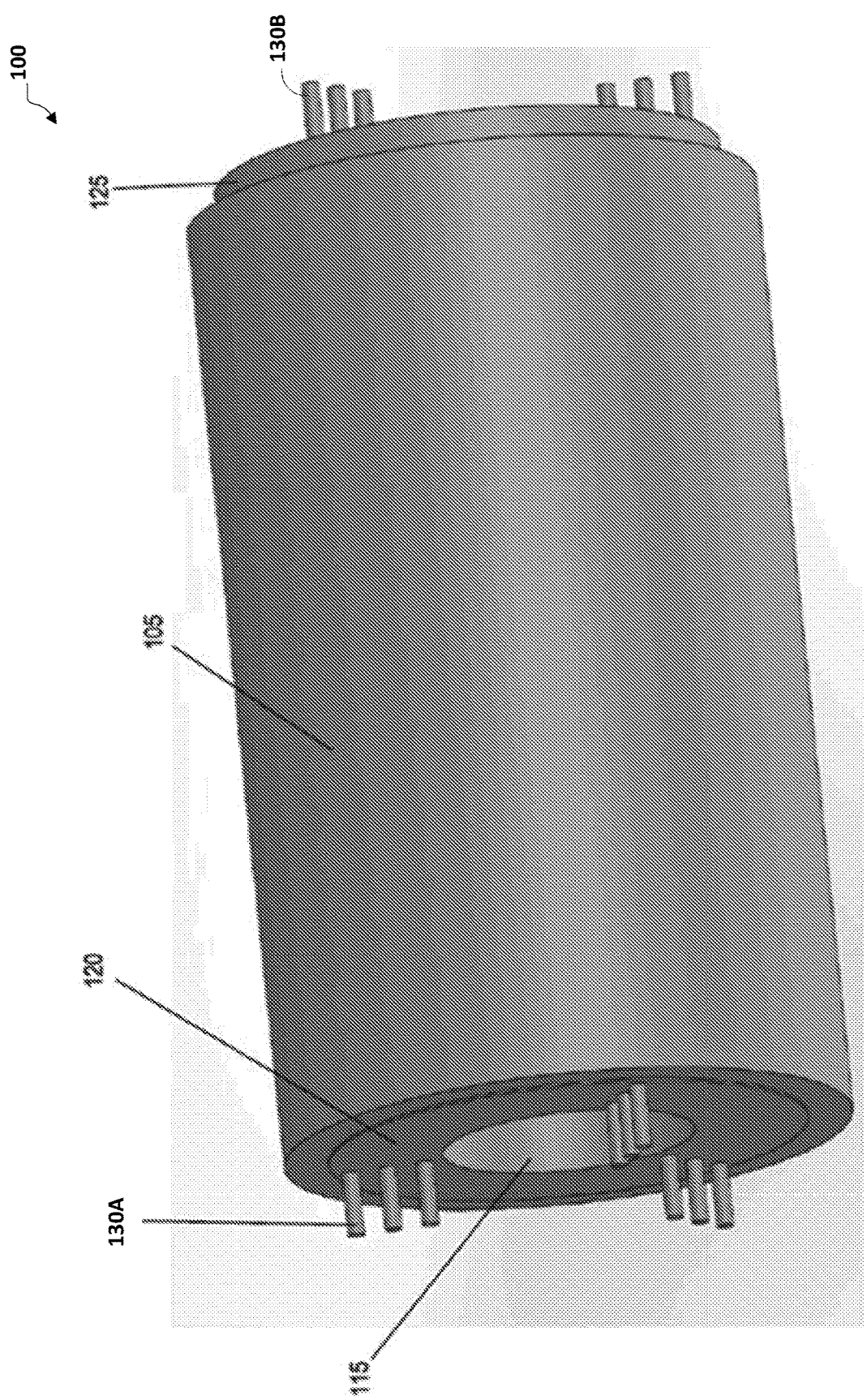
FIG. 1 is a perspective view of a solid-state transducer, in accordance with one embodiment of the present disclosure.

FIG. 1 is a perspective view of a solid-state transducer 100. The solid-state transducer 100 is an electroacoustic transducer that converts an electrical audio signal into a corresponding sound.

In the embodiment of FIG. 1, the solid-state transducer 100 includes a housing 105 with a first end and a second end and defines an aperture between the first end and the second. The exterior shape and materials of the housing 105 is a matter of design choice for the system. In some examples, the housing 105 has a circular cross-sectional shape because the solid-state transducer 100 is part of a vehicle exhaust system that typically has a circular cross-sectional shape. In some examples, the housing 105 may be comprised of one or more solid high temperature resistant materials including metal, ceramics, or any other suitable high temperature resistant material.

In the embodiment of FIG. 1, the solid-state transducer 100 includes a first end portion 120 and a second end portion 125. The first end portion 120 is positioned at the first end of the aperture defined by the housing 105. The first end portion 120 defines a first main aperture 115, a first plurality of apertures, and a first plurality of recessions. The first main aperture 115 is configured to either receive the sound of a fluid-flow system or output sound produced by the solid-state transducer 100. As illustrated in FIG. 1, the first plurality of apertures receives a plurality of electrical conductors 130 as described in greater detail below. The first plurality of apertures may also form one or more first concentric rings.

The second end portion 125 is positioned at the second end of the aperture defined by the housing 105 and opposite from the first end portion 120. The second end portion 125 defines a second main aperture, a second plurality of apertures, and a second plurality of recessions (not shown in this perspective view). The second main aperture is configured to either receive the sound of a fluid-flow system or output sound produced by the solid-state transducer 100. As illustrated in FIG. 1, the second plurality of apertures also receives the plurality of electrical conductors 130. The second plurality of apertures may also form one or more second concentric rings. In some examples, the first end portion 120 and the second end portion 125 may be comprised of an electrically insulating material including Teflon, ceramic, or any other suitable electrically insulating material.

In the embodiment of FIG. 1, the solid-state transducer 100 includes the plurality of electrical conductors 130. A first group 130A of the plurality of electrical conductors 130 is within and extends from one of the first plurality of apertures to the second end portion 125 (e.g., to a corresponding one of the second plurality of recessions defined by the second end portion 125). In some embodiments, ends of the first group 130A of the plurality of electrical conductors 130 may be terminated within the second plurality of recessions. A second group 130B of the plurality of electrical conductors 130 is within and extends from one of the second plurality of apertures to the first end portion 120 (e.g., to a corresponding one of the first plurality of recessions defined by the first end portion 120). In some embodiments, ends of the second group 130B of the plurality of electrical conductors 130 are terminated within the first plurality of recessions. The number and placement of the plurality of electrical conductors 130 can vary depending on numerous factors, as discussed below. In some examples, the plurality of electrical conductors 130 are comprised of an electrically conductive material including copper, gold, silver, aluminum, any other suitable electrically conductive material, or a combination thereof.

The plurality of electrical conductors 130 are configured to support and hold in place a thin-film resistive material (not shown). The thin-film resistive material is disposed between and in electrical communication with the plurality of electrical conductors 130. The thin-film resistive material is configured to receive one or more electrical signals from the plurality of electrical conductors 130. The thin-film resistive material is also configured to generate thermal oscillations to create pressure waves in a medium in response to receiving the one or more electrical signals. In the embodiment of FIG. 1, the medium is a fluid flowing from the first main aperture 115 of the first end portion 120 to the second main aperture of the second end portion 125. In some examples, the medium is exhaust from an exhaust pipe of an internal combustion engine. In other examples, the medium is air from outlet pipe from an HVAC system. In yet other examples, the medium is any fluid from a pipe of fluid-flowing system. In some examples, the thin-film resistive material may include carbon nanotube films, an array of carbon nanotube wires, porous carbon foams, freestanding graphene, graphene on a substrate, an array of metal nanowires, nanoscale thickness metal films, conductive polymer thin films, boron nitride nanotubes, or any combination thereof.

The solid-state transducer 100 includes several layers of the thin-film resistive material wrapped, coaxially, around a pipe or cylinder in which acoustic plane waves propagate. The coaxial wrap is a continuous material as opposed to an array of discrete transducers. The thin-film resistive material should have very low heat capacity per unit area, on the order of $10^{-3}$ $J/m^2K$ or lower, and the individual film thickness is on the order of micrometers to nanometers. Three or more electrical conductors of the plurality of electrical conductors may be positioned in an axial-symmetric pattern (six groups of electrical conductors are shown in a hexagonal arrangement in FIG. 2 below) at a slightly larger radius than that of the pipe or cylinder radius. The thin film resistive material is then wrapped around the plurality of conductors 130 to form a cylinder-like film layer. The more electrodes that are used in a single radius, the closer the geometry of the cylinder-like film layer is to a cylinder, which increases the accuracy of the plane wave generation by the solid-state transducer 100.

Several concentric rings of similar design can be overlaid in a successively larger manner because the material must be acoustically transparent (meaning it freely passes acoustic waves through it). The thin-film resistive material is electrically attached to the plurality of electrical conductors 130 using densification or some other suitable technique. Alternating electrical current is then passed through the thin-film resistive material, via the plurality of electrical conductors 130, in order to generate thermal oscillations to create pressure waves in a medium in response to receiving the one or more electrical signals. The pressure waves created by the thin-film resistive material cancel or shape the acoustic plane wave passing through the solid-state transducer 100. The solid-state transducer 100 creates plane waves because it is coaxial and acoustically compact. The overall length and thickness of the solid-state transducer 100 may be much less than a wavelength of the sound to be cancelled or shaped. For example, the wavenumber-length and wavenumber-wall thickness products may be much less than one, or less than one-sixth. The solid-state transducer 100 may be attached to a pipe system by inserting it in line with the existing pipe system. The inner diameter of the first main aperture 115 or the second main aperture, being the same diameter as the pipe it is attached to, does not cause any impedance discontinuities.

Additionally, in certain embodiments, the thin-film resistive material is separated from the pipe or medium by a thin, acoustically transparent diaphragm, such as Mylar or similar material. The diaphragm isolates the thin-film resistive material from possible flow or particulate in the pipe. However, the diaphragm does not to act as a moving acoustic diaphragm because it is acoustically transparent. The gaseous environment within the solid-state transducer 100 (i.e., the environment between the diaphragm and the housing 105) may be any gas. In some examples, the gas may be an inert gas, for example, argon gas to limit combustion on the surface of the thin-film resistive material.

Figure 2:
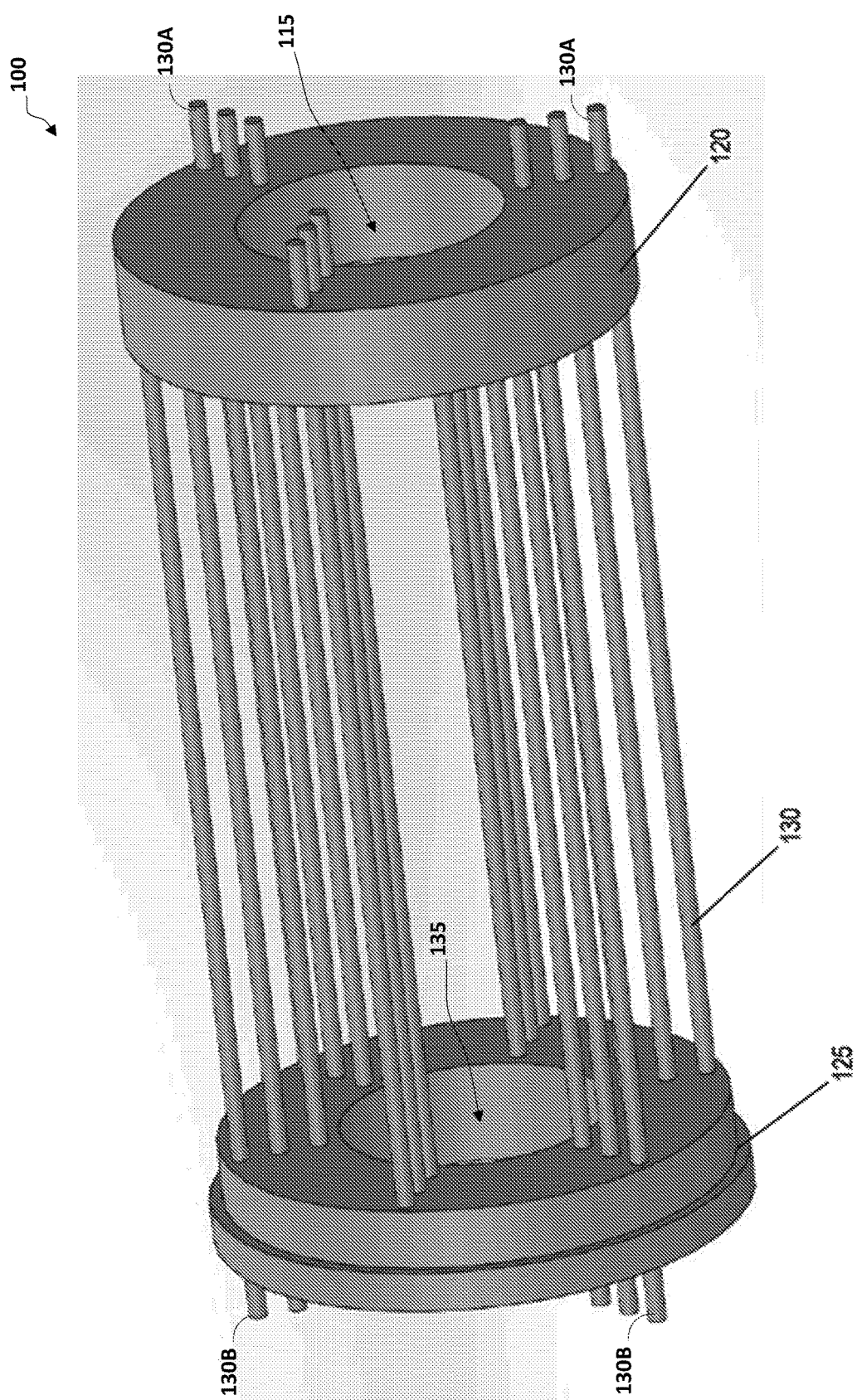
FIG. 2 is a perspective view of the solid-state transducer of FIG. 1 without the thin-film resistive material and the housing.

FIG. 2 is a perspective view of the solid-state transducer 100 of FIG. 1 without the thin-film resistive material and the housing 105. In the illustrated embodiment of FIG. 2, the solid-state transducer 100 includes second main aperture 135 in addition to the first main aperture 115. Additionally, FIG. 2 illustrates the termination of the first group 130A of the plurality of electrical conductors 130 in the second plurality of recessions and the termination of the second group 130B of the plurality of electrical conductors 130 in the first plurality of recessions.

Figure 3:
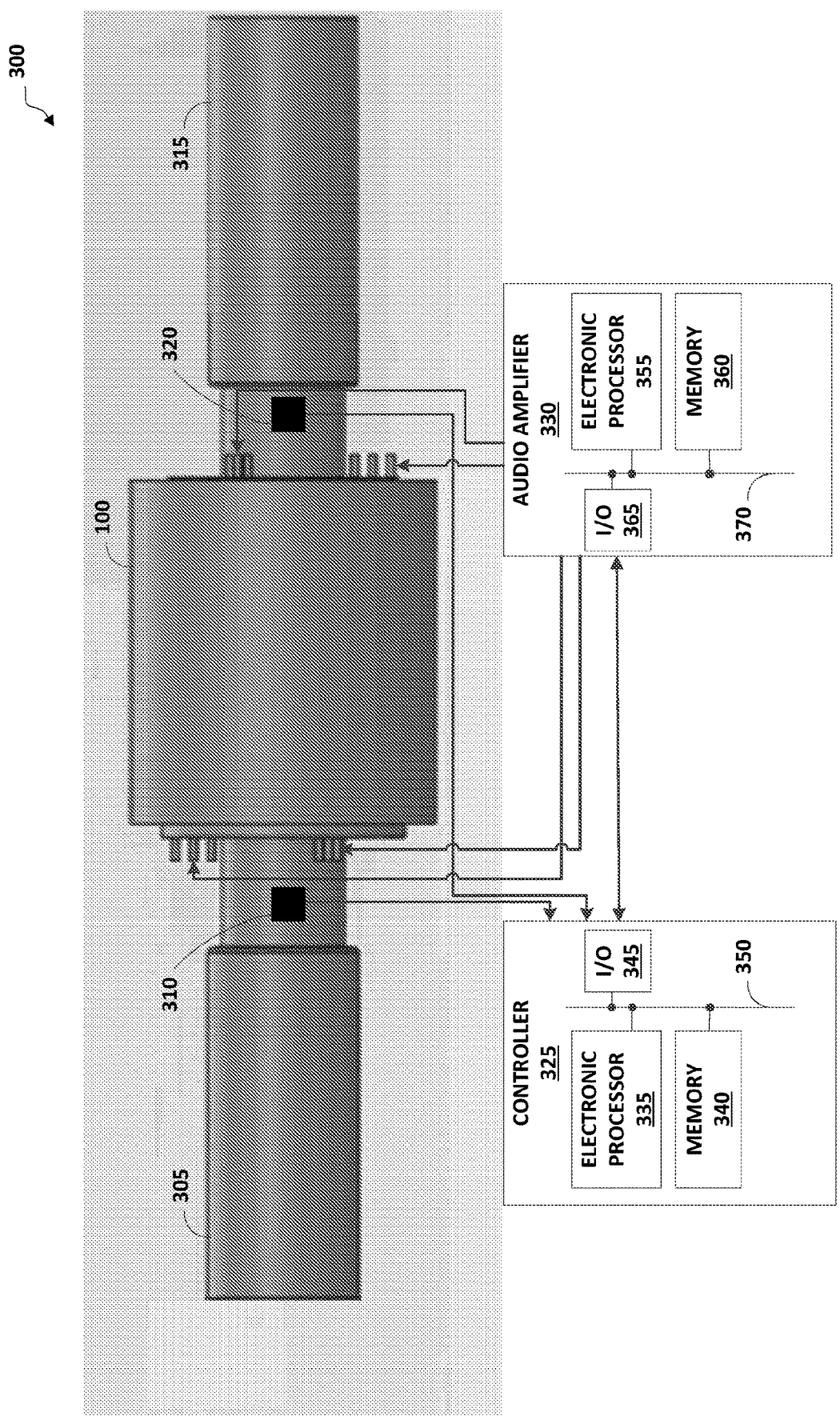
FIG. 3 is a perspective view of a system including the solid-state transducer of FIG. 1, in accordance with one embodiment of the present disclosure.

FIG. 3 is a perspective view of a system 300 including the solid-state transducer 100 of FIG. 1, in accordance with various aspects of the present disclosure. In the embodiment of FIG. 3, the system 300 includes an input pipe 305 with an input sensor 310. The input pipe 305 is connected to one main aperture of the solid-state transducer 100. Similarly, the system 300 includes output pipe 315 with an output sensor 320 connected to the other main aperture of the solid-state transducer 100. The system 300 also includes a controller 325 and an audio amplifier 330.

The input sensor 310 measures acoustic noise entering the solid-state transducer 100 from the input pipe 305 and outputs a signal indicative of the measured acoustic noise to the controller 325. In some examples, the input sensor 310 is one of a microphone, a pressure sensor, an accelerometer, or a tachometer.

Similarly, the output sensor 320 measures acoustic noise exiting the solid-state transducer 100 to the output pipe 315 and outputs a signal indicative of the measured acoustic noise to the controller 325. In some examples, the output sensor 320 is one of a microphone, a pressure sensor, an accelerometer, or a tachometer.

The controller 325 is configured to control the audio amplifier 330 to provide one or more electrical signals to the solid-state transducer 100 based on the signal indicative of the measured acoustic noise received from the input sensor 310. For example, the controller 325 controls the audio amplifier 330 to provide one or more electrical signals to the solid-state transducer 100 to reduce the noise level exiting the solid-state transducer 100 by canceling at least a portion of the noise entering the solid-state transducer. In another example, the controller 325 controls the audio amplifier 330 to provide one or more electrical signals to the solid-state transducer 100 to change or shape the noise level exiting the solid-state transducer 100 by canceling a specific portion of the noise entering the solid-state transducer.

The controller 325 is also configured to control the audio amplifier 330 to provide one or more electrical signals to the solid-state transducer 100 based on the signal indicative of the measured acoustic noise received from the output sensor 320. For example, the controller 325 controls the audio amplifier 330 to provide one or more electrical signals to the solid-state transducer 100 to reduce the noise level exiting the solid-state transducer 100 by canceling at least a portion of the noise entering the solid-state transducer using the signal indicative of the measured acoustic noise received from the output sensor 320. In another example, the controller 325 controls the audio amplifier 330 to provide one or more electrical signals to the solid-state transducer 100 to change or shape the noise level exiting the solid-state transducer 100 using the signal indicative of the measured acoustic noise received from the output sensor 320 to cancel specific portion of the noise entering the solid-state transducer.

The controller 325 includes an electronic processor 335, a memory 340, and an input/output (I/O) interface 345. The electronic processor 335, the memory 340, and the input/output interface 345 communicate over one or more communication buses 350. The controller 325 may include additional or different components than those components illustrated in FIG. 3 and may be configured to perform additional functionality than the functionality described herein.

The memory 340 may include a program storage area (e.g., read only memory (ROM)) and a data storage area (e.g., random access memory (RAM), and other non-transitory, computer-readable medium). For example, the data storage area of the memory 340 may store (for example, in a lookup table or other suitable format) information regarding different desired noise levels or noise shapes that will be produced by the solid-state transducer 100 as part of the system 300.

The electronic processor 335 (e.g., a microprocessor or other suitable processing device) is coupled to the memory 340 and executes machine-readable instructions stored in the memory 340. For example, instructions stored in the memory 340, when executed by the electronic processor 335, may cause the controller 325 to communicate with and/or control the audio amplifier via the input/output interface 345 using one or more external communication buses.

The audio amplifier 330 may include an electronic processor 355, a memory 360, and an input/output (I/O) interface 365 that is similar to the electronic processor 335, the memory 340, the I/O interface 345, and one or more communication buses 370, respectively, as described above. Alternatively, in some embodiments, the audio amplifier 330 may be included in the controller 325.

Figure 4:
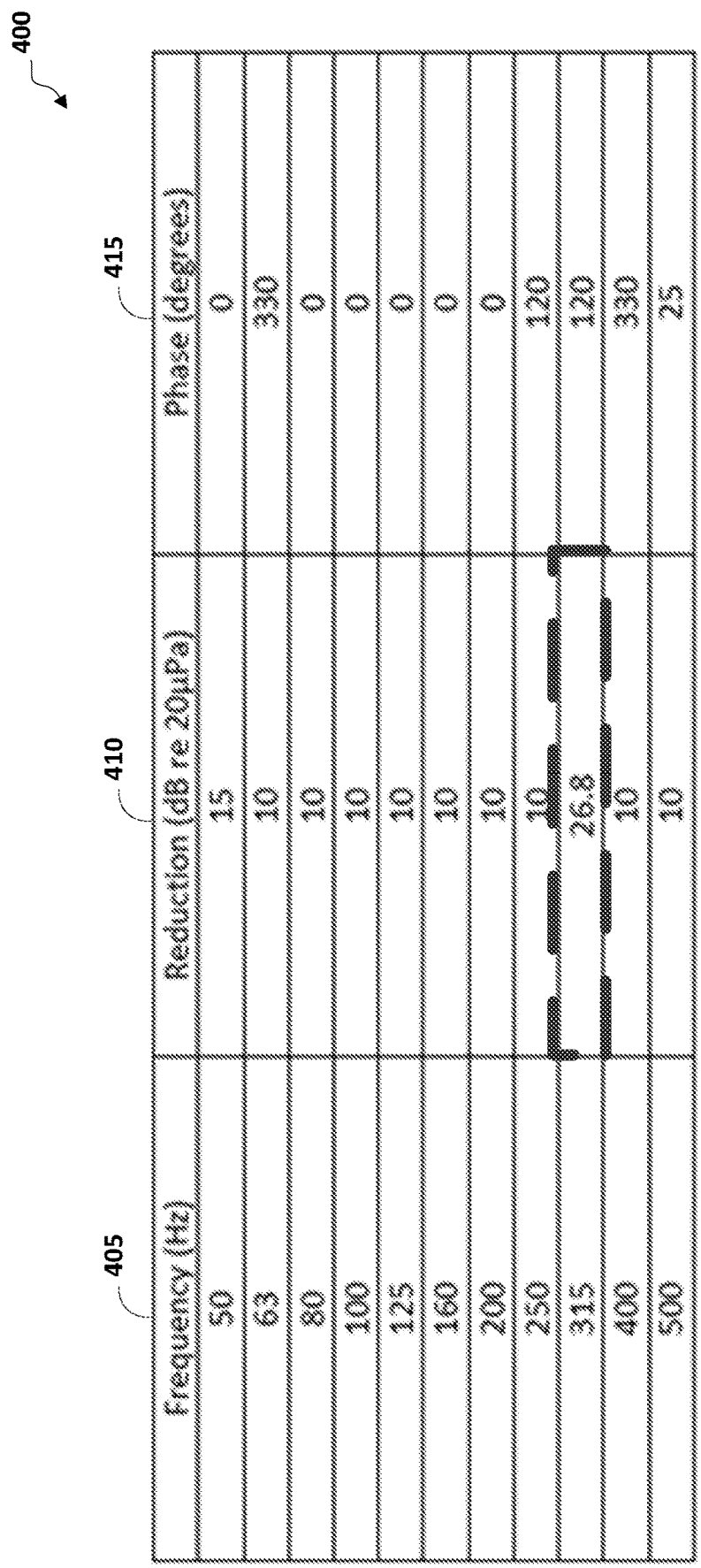
FIG. 4 is a table illustrating the sound attenuation of the solid-state transducer of FIG. 1 over a range of frequencies.

FIG. 4 is a table 400 illustrating one example of sound attenuation of the solid-state transducer 100 of FIG. 1 in decibels over a range of frequencies. The table 400 includes a frequency column 405, a reduction column 410, and a phase column 415. The frequencies listed in the frequency column 405 are frequencies in air at standard temperature and pressure. As illustrated in FIG. 4, at 315 hertz (Hz), the solid-state transducer 100 was able to achieve 26.8 dB attenuation of the noise level under manual control. The reduction of 26.8 decibels is much more attenuation than conventional active noise control systems, which yield 10-15 dB of attenuation.

Figure 5:
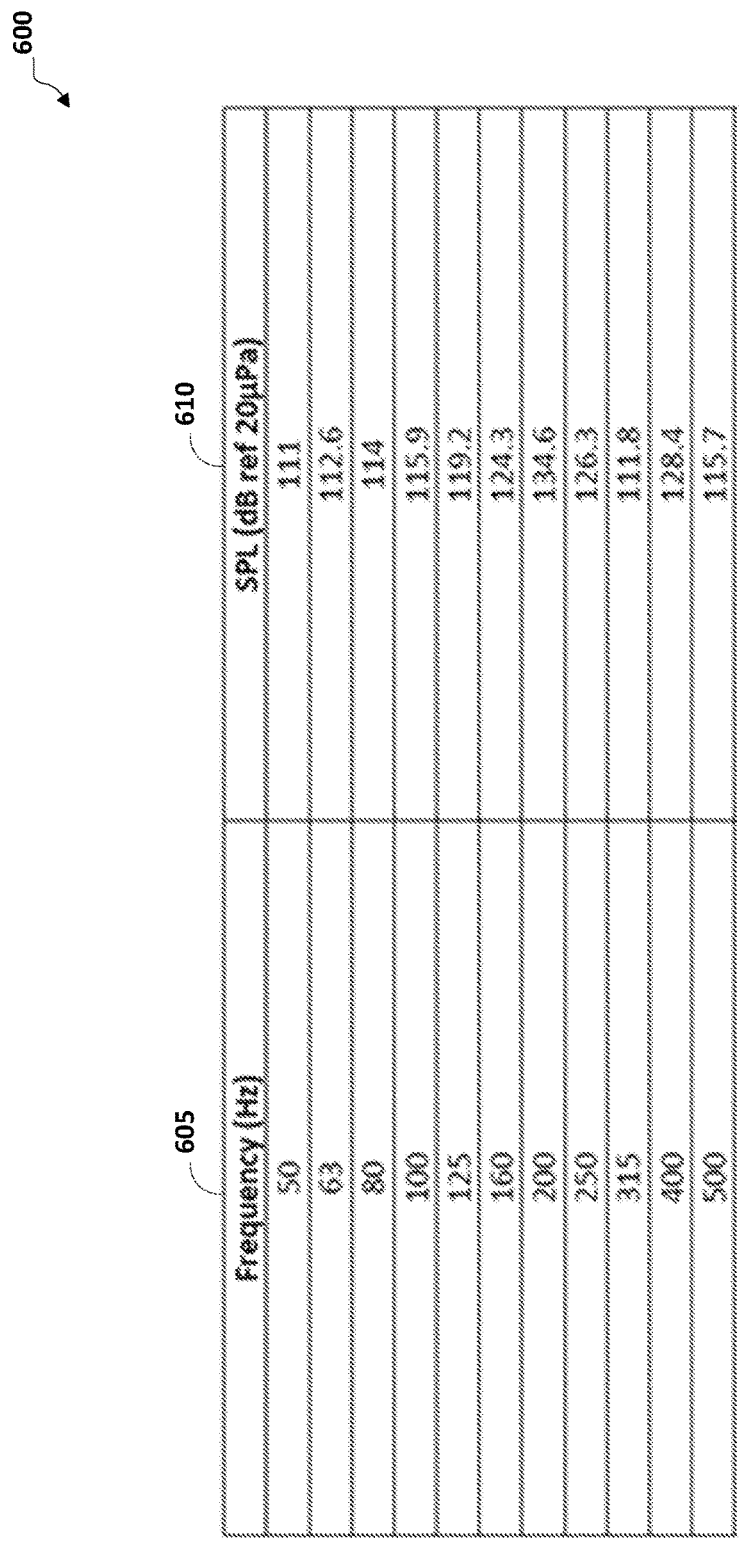
FIG. 5 is a table illustrating the measured sound pressure level generated by the solid-state transducer of FIG. 1.

FIG. 5 is a table 600 illustrating the measured sound pressure level generated by the solid-state transducer 100 of FIG. 1. The table 600 includes a frequency column 605 and a sound pressure level (SPL) column 610.

The solid-state transducer 100 generated sound pressure levels ranging between 110-135 dB across 50-500 hertz (Hz), which is in the range of the sound pressure levels of a conventional exhaust system. In the example of FIG. 5, the solid-state transducer 100 generated the sound pressure levels at two hundred and seventy watts (W) of input power, which is less power than an open-air thermophone. Accordingly, the solid-state transducer 100 uses relatively low input power to produce sound pressure levels that match the sound pressure levels generated by a conventional exhaust system. Put simply, the solid-state transducer 100 may use low input power to cancel or shape the sound pressure levels generated by a conventional exhaust system.

Figure 6:
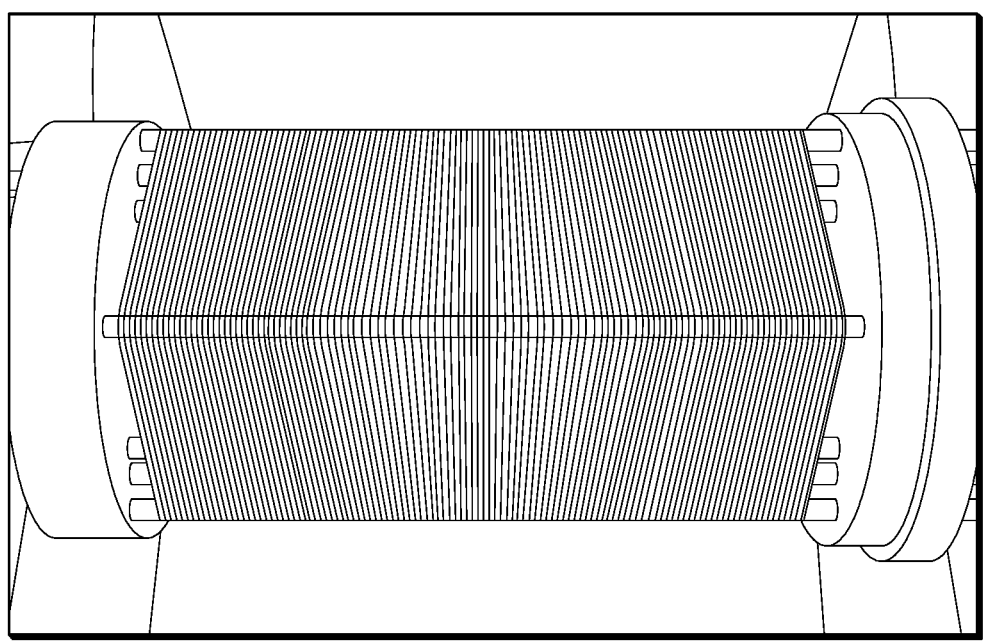
FIG. 6 is a picture illustrating a solid-state transducer, in accordance with another embodiment of the present disclosure.

FIG. 6 is a picture illustrating a solid-state transducer 700, in accordance with another embodiment of the present disclosure. The solid-state transducer 700 has a length of six and a half inches and a diameter of four inches with three layers of thin-film resistive material in a hexagonal shape. Each of the three thin-film resistive material layers is comprised 5 layers of aligned carbon-nanotube film. The solid-state transducer 700 is designed for an exhaust pipe having a two and half inch diameter.

Figure 7:
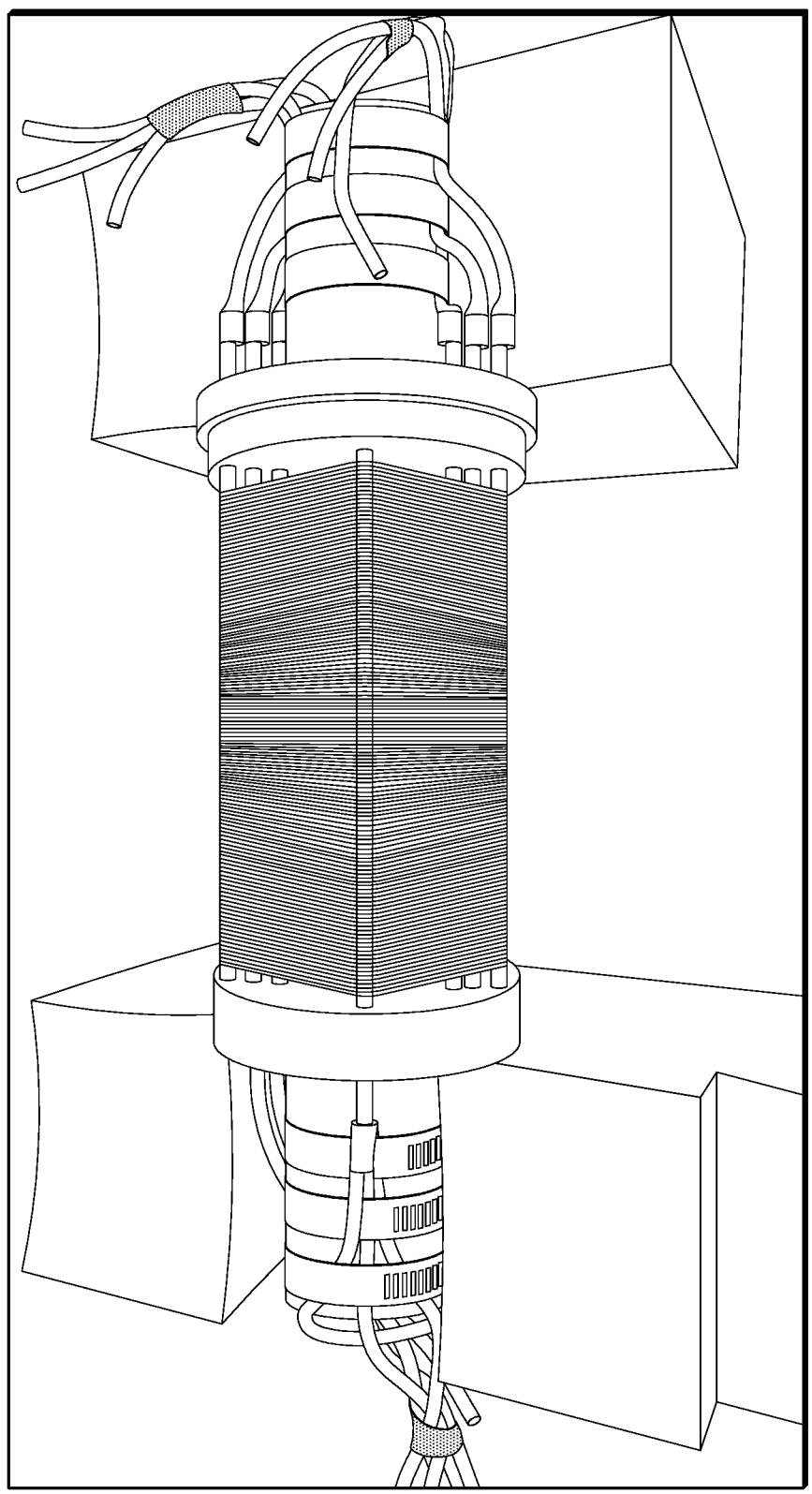
FIG. 7 is a picture illustrating the solid-state transducer of FIG. 6 with coupled cables and in a portion of a fluid-flow system.

FIG. 7 is a picture illustrating the solid-state transducer 700 of FIG. 6 with coupled cables and in a portion of a fluid-flow system. The blue wires (on the left) are negative electrical terminals and the red wires (on the right) are positive electrical terminals. Wires are attached to the plurality of electrical conductors (for example, copper conductors) using conventional soldering techniques. Wires of like color are bound together and connected to corresponding ports of an audio power amplifier.

Figure 8:
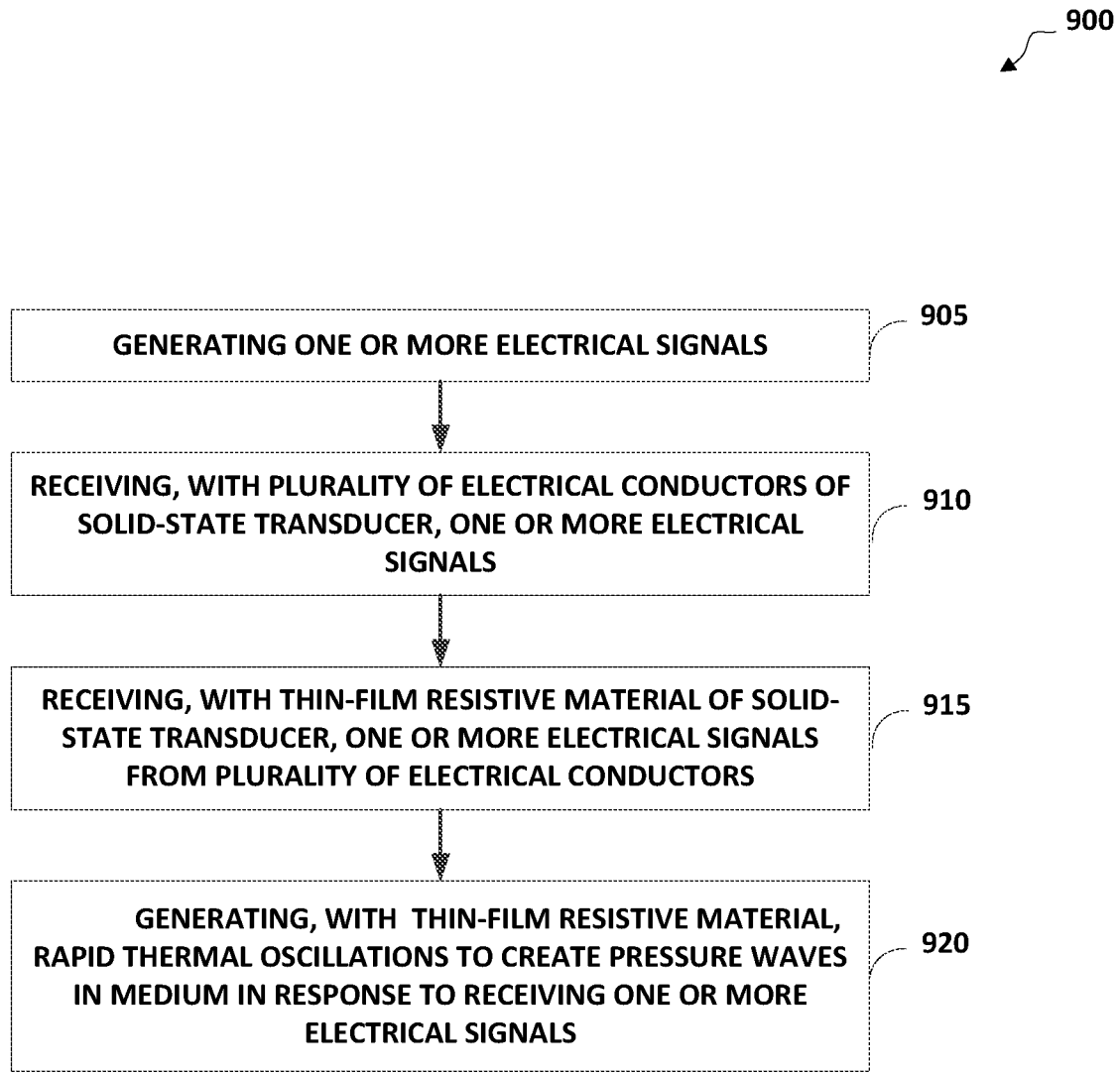
FIG. 8 is a flowchart illustrating an exemplary method for operating a solid-state transducer, in accordance with various embodiments of the present disclosure.

FIG. 8 is a flowchart illustrating an exemplary method 900 for operating a solid-state transducer, in accordance with various embodiments of the present disclosure. The method 900 includes generating one or more electrical signals (at block 905). The method 900 includes receiving, with a plurality of electrical conductors of a solid-state transducer, the one or more electrical signals from the audio amplifier (at block 910). The method 900 includes receiving, with a thin-film resistive material of the solid-state transducer, the one or more electrical signals from the plurality of electrical conductors (at block 915). The method 900 also includes generating, with the thin-film resistive material, thermal oscillations to create pressure waves in a medium in response to receiving the one or more electrical signals (at block 920).

In some examples, the solid-state transducer in the method 900 includes a housing, a first end portion, a second end portion, a plurality of electrical conductors, and a thin-film resistive material. The housing of the solid-state transducer has a first end and a second end and defines an aperture between the first end and the second end. The first end portion positioned at the first end of the housing, the first end portion defining a first main aperture and a first plurality of apertures. The second end portion positioned at the second end of the housing, the second end portion defining a second main aperture and a second plurality of apertures. A first group of the plurality of electrical conductors is within and extends from one of the first plurality of apertures to the second end portion. A second group of the plurality of electrical conductors is within and extends from one of the second plurality of apertures to the first end portion. The thin-film resistive material is disposed between and in electrical communication with the plurality of electrical conductors. The thin-film resistive material is configured to receive one or more electrical signals from the plurality of electrical conductors, and generate thermal oscillations to create pressure waves in a medium in response to receiving the one or more electrical signals.

Figure 9:
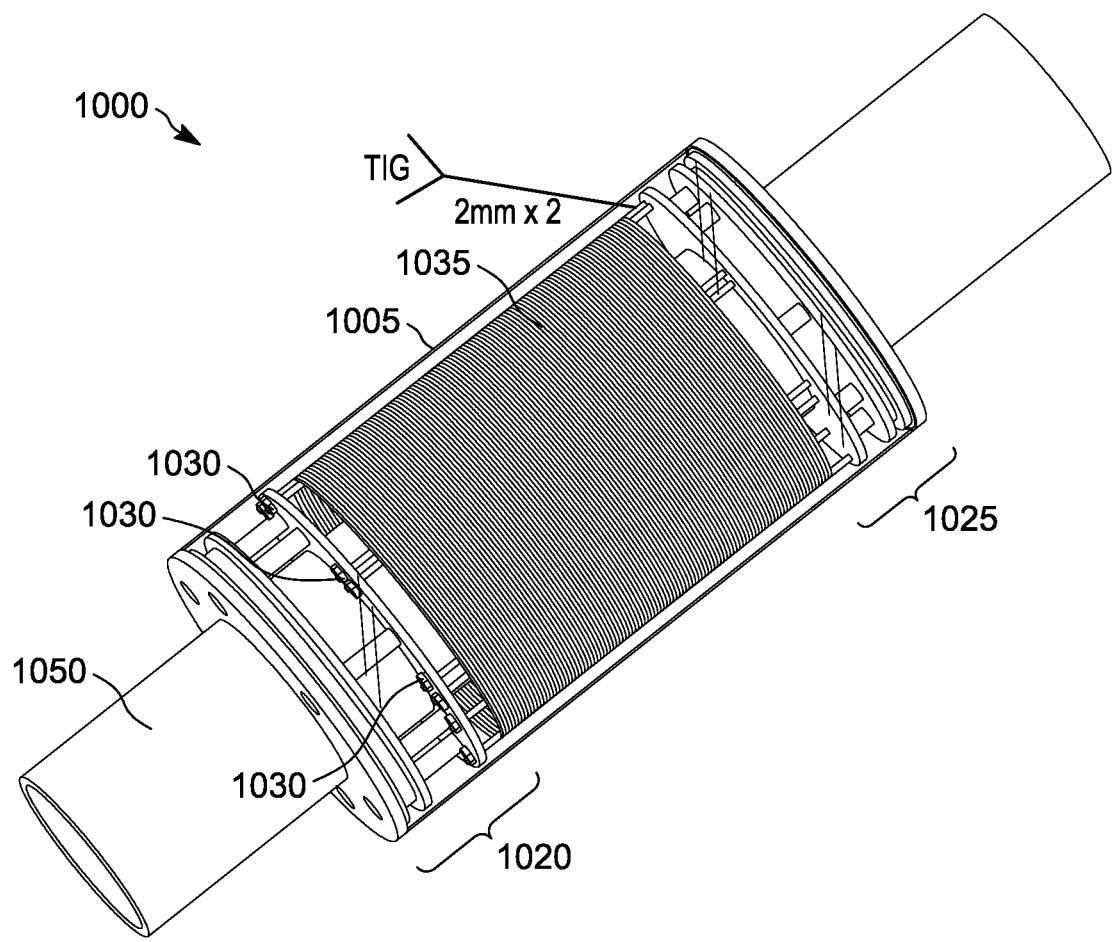
FIG. 9 is a perspective view of a solid-state transducer, in accordance with a third embodiment of the present disclosure.

FIG. 9 is a perspective view of a solid-state transducer 1000, in accordance with a third embodiment of the present disclosure. The solid-state transducer 1000 is similar to the solid-state transducer 100 of FIG. 1, as described above. Additionally, the method 900 may be applied to the solid-state transducer 1000.

In the embodiment of FIG. 9, the solid-state transducer 1000 includes a housing 1005 with a first end and a second end and defines an aperture between the first end and the second. The exterior shape and materials of the housing 1005 is a matter of design choice for the system. In some examples, the housing 1005 has a circular cross-sectional shape because the solid-state transducer 1000 is part of a vehicle exhaust system that typically has a circular cross-sectional shape. In some examples, the housing 1005 may be comprised of one or more solid high temperature resistant materials including metal, ceramics, or any other suitable high temperature resistant material.

In the embodiment of FIG. 9, the solid-state transducer 1000 includes a first end portion 1020 and a second end portion 1025. The first end portion 1020 is positioned at the first end of the aperture defined by the housing 1005. The first end portion 1020 defines a first main aperture and a first plurality of apertures. The first main aperture is configured to receive a slotted pipe 1050 described in greater detail below. As illustrated in FIG. 9, the first plurality of apertures receives a plurality of electrical conductors 1030 as described in greater detail below. The first plurality of apertures may also form one or more first concentric rings.

The second end portion 1025 is positioned at the second end of the aperture defined by the housing 1005 and opposite from the first end portion 1020. The second end portion 1025 defines a second main aperture and a second plurality of apertures (not shown in this perspective view). The second main aperture is also configured to receive the slotted pipe 1050. As illustrated in FIG. 9, the second plurality of apertures also receives the plurality of electrical conductors 1030. The second plurality of apertures may also form one or more second concentric rings that correspond to the one or more first concentric rings. In some examples, the first end portion 1020 and the second end portion 1025 may be comprised of an electrically insulating material including Teflon, ceramic, or any other suitable electrically insulating material. Additionally, the first end portion 1020 and the second end portion 1025 may also be comprised of an electrically conductive material (for example, metal) that attaches to the electrically insulating material to form the first end portion 1020 and the second end portion 1025.

The plurality of electrical conductors 1030 are configured to support and hold in place a thin-film resistive material 1035. A first group of the plurality of electrical conductors 1030 is within and extends from one of the first plurality of apertures to the second end portion (e.g., to a corresponding one of the second plurality of apertures defined by the second end portion). Similarly, a second group of the plurality of electrical conductors 1030 is within and extends from one of the second plurality of apertures to the first end portion (e.g., to a corresponding one of the first plurality of apertures defined by the first end portion). The number and placement of the plurality of electrical conductors 1030 can vary depending on numerous factors. In some examples, the plurality of electrical conductors 1030 are comprised of an electrically conductive material including copper, gold, silver, aluminum, any other suitable electrically conductive material, or a combination thereof.

The thin-film resistive material 1035 is disposed between and in electrical communication with the plurality of electrical conductors 1030. The thin-film resistive material 1035 is configured to receive one or more electrical signals from the plurality of electrical conductors 1030. The thin-film resistive material 1035 is also configured to generate thermal oscillations to create pressure waves in a medium in response to receiving the one or more electrical signals (e.g., a medium within the slotted pipe 1050. In the embodiment of FIG. 9, the medium is a fluid flowing to or from the first end portion 1020 from or to the second end portion 1025. In some examples, the medium is exhaust from an exhaust pipe of an internal combustion engine. In other examples, the medium is air from outlet pipe from an HVAC system. In yet other examples, the medium is any fluid from a pipe of fluid-flowing system. In some examples, the thin-film resistive material 1035 may include carbon nanotube films, an array of carbon nanotube wires, porous carbon foams, freestanding graphene, graphene on a substrate, an array of metal nanowires, nanoscale thickness metal films, conductive polymer thin films, boron nitride nanotubes, or any combination thereof.

The solid-state transducer 100 includes several layers of the thin-film resistive material 1035 wrapped, coaxially, around the slotted pipe 1050 in which acoustic plane waves propagate. The slotted pipe 1050 is just one example. In other embodiments, a pipe with a different type of porous structure (e.g., a perforated pipe) may be used instead of the slotted pipe 1050 to allow pressure waves generated by the thin-film resistive material 1035 to pass through the pipe.

The coaxial wrap of the thin-film resistive material 1035 is a continuous material as opposed to an array of discrete transducers. The thin-film resistive material 1035 should have very low heat capacity per unit area, on the order of $10^{-3}$ J/m$^2$K or lower, and the individual film thickness is on the order of micrometers to nanometers. Three or more electrical conductors of the plurality of electrical conductors 1030 may be positioned in an axial-symmetric pattern at a slightly larger radius than that of the pipe or cylinder radius. The thin film resistive material 1035 is then wrapped around the plurality of conductors 1030 to form a cylinder-like film layer. The more electrodes that are used in a single radius, the closer the geometry of the cylinder-like film layer is to a cylinder, which increases the accuracy of the plane wave generation by the solid-state transducer 1000.

Several concentric rings of similar design can be overlaid in a successively larger manner because the material is acoustically transparent (meaning it freely passes acoustic waves through it). The thin-film resistive material 1035 is electrically attached to the plurality of electrical conductors 1030 using densification or some other suitable technique. Alternating electrical current is then passed through the thin-film resistive material 1035, via the plurality of electrical conductors 1030, in order to generate thermal oscillations to create pressure waves in a medium in response to receiving the one or more electrical signals. The pressure waves created by the thin-film resistive material 1035 cancel or shape the acoustic plane wave passing through the solid-state transducer 1000. The solid-state transducer 1000 creates plane waves because it is coaxial and acoustically compact. The overall length and thickness of the solid-state transducer 1000 may be much less than a wavelength of the sound to be cancelled or shaped. For example, the wavenumber-length and wavenumber-wall thickness products may be much less than one, or less than one-sixth. The solid-state transducer 1000 may be inserted in line with an existing pipe system. The inner diameter of the slotted pipe 1050 is the same diameter as the pipe of the existing pipe system, and does not cause any impedance discontinuities.

Additionally, in certain embodiments, the thin-film resistive material 1035 is separated from the slotted pipe 1050 by a thin, acoustically transparent diaphragm, such as Mylar or similar material. The diaphragm isolates the thin-film resistive material 1035 from possible flow or particulate in the slotted pipe 1050. However, the diaphragm does not to act as a moving acoustic diaphragm because it is acoustically transparent. The gaseous environment within the solid-state transducer 1000 (i.e., the environment between the diaphragm and the housing 1005) may be any gas. In some examples, the gas may be an inert gas, for example, argon gas to limit combustion on the surface of the thin-film resistive material 1035.

Figure 10:
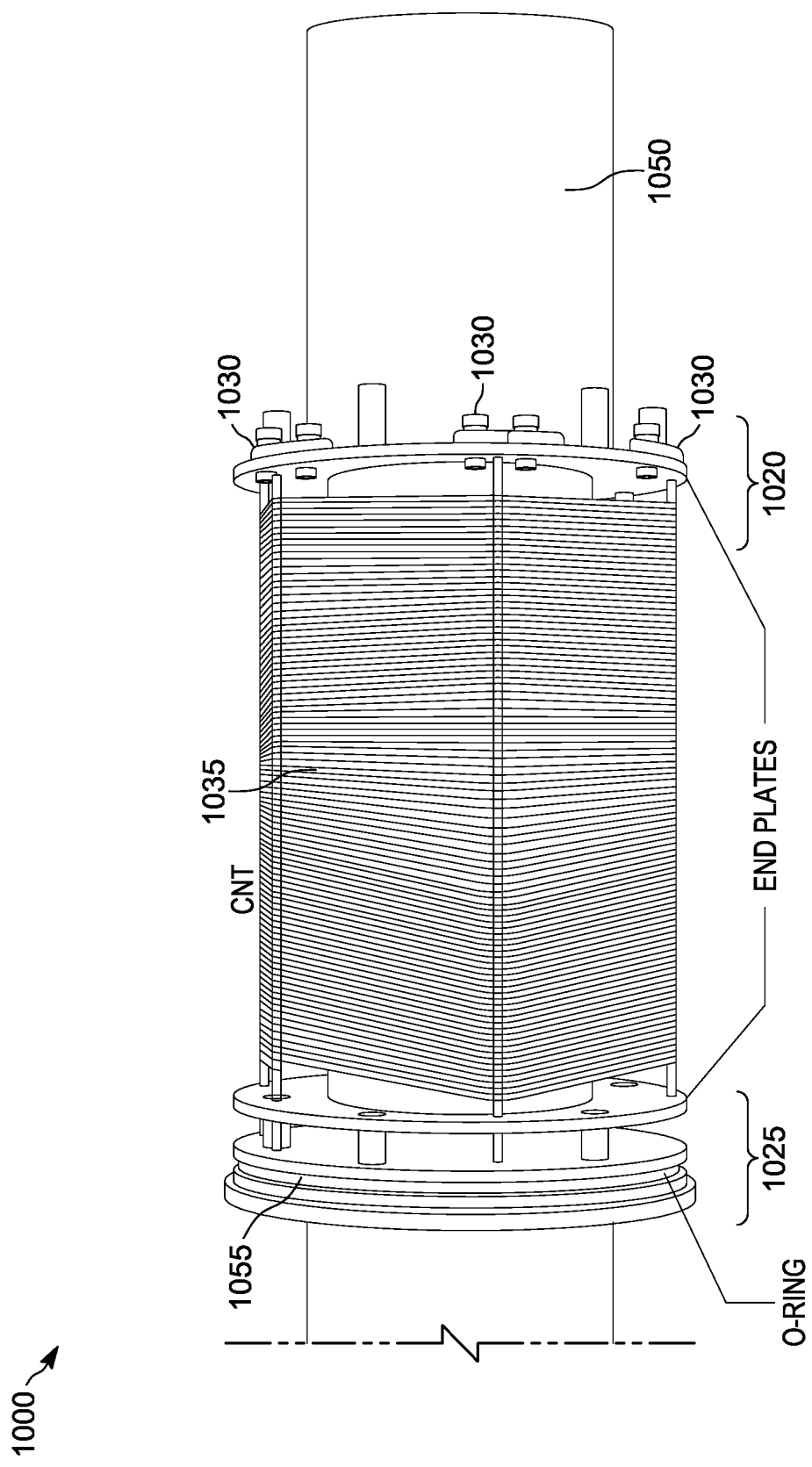
FIG. 10 is a picture illustrating the solid-state transducer of FIG. 9, in accordance with the third embodiment of the present disclosure.

FIG. 10 is a picture illustrating the solid-state transducer 1000, in accordance with the third embodiment of the present disclosure. In the example of FIG. 10, the second end portion 1025 includes an O-ring 1055.

Figure 11:
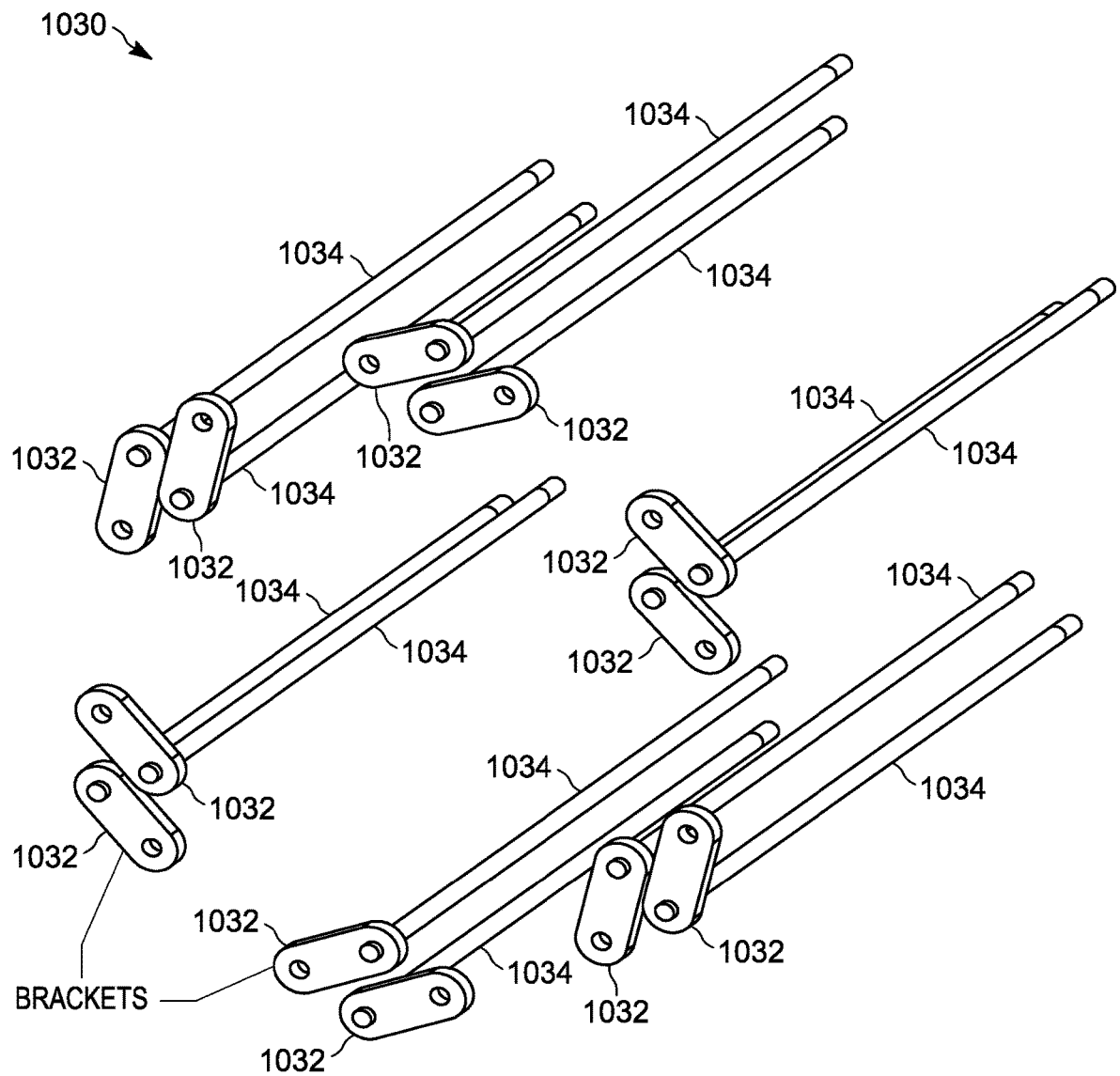
FIG. 11 is a perspective view of a plurality of electrodes in the solid-state transducer of FIG. 9.

FIG. 11 is a perspective view of a plurality of electrodes 1030 in the solid-state transducer 1000. In the example of FIG. 11, each of the plurality of electrodes 1030 includes a bracket portion 1032 and a conductor portion 1034. The bracket portion 1032 prevents the rotations of the conductor portion 1034. The conductor portion 1034 supports and is in electrical communication with the thin-film resistive material 1035 as described above.

Figure 12:
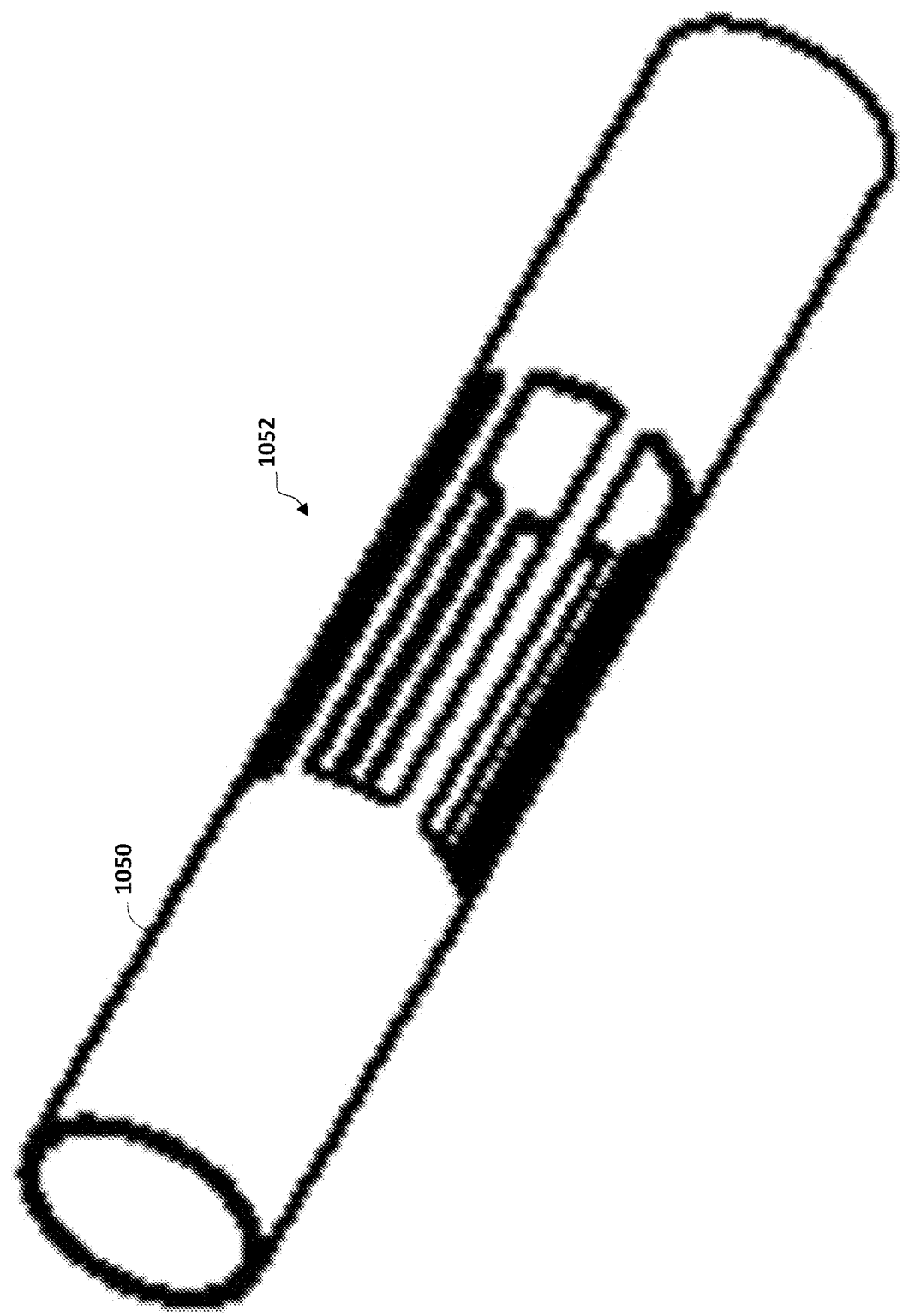
FIG. 12 is a perspective view of a slotted pipe in the solid-state transducer of FIG. 9.

FIG. 12 is a perspective view of a slotted pipe 1050 in the solid-state transducer 1000. In the example of FIG. 12, the slotted pipe 1050 has a plurality of slots 1052. The plurality of slots 1052 allow the pressure waves generated by the thin-film resistive material 1035 as described above to reduce or change the acoustic waves passing through the slotted pipe 1050.

Figures 13A, 13B:
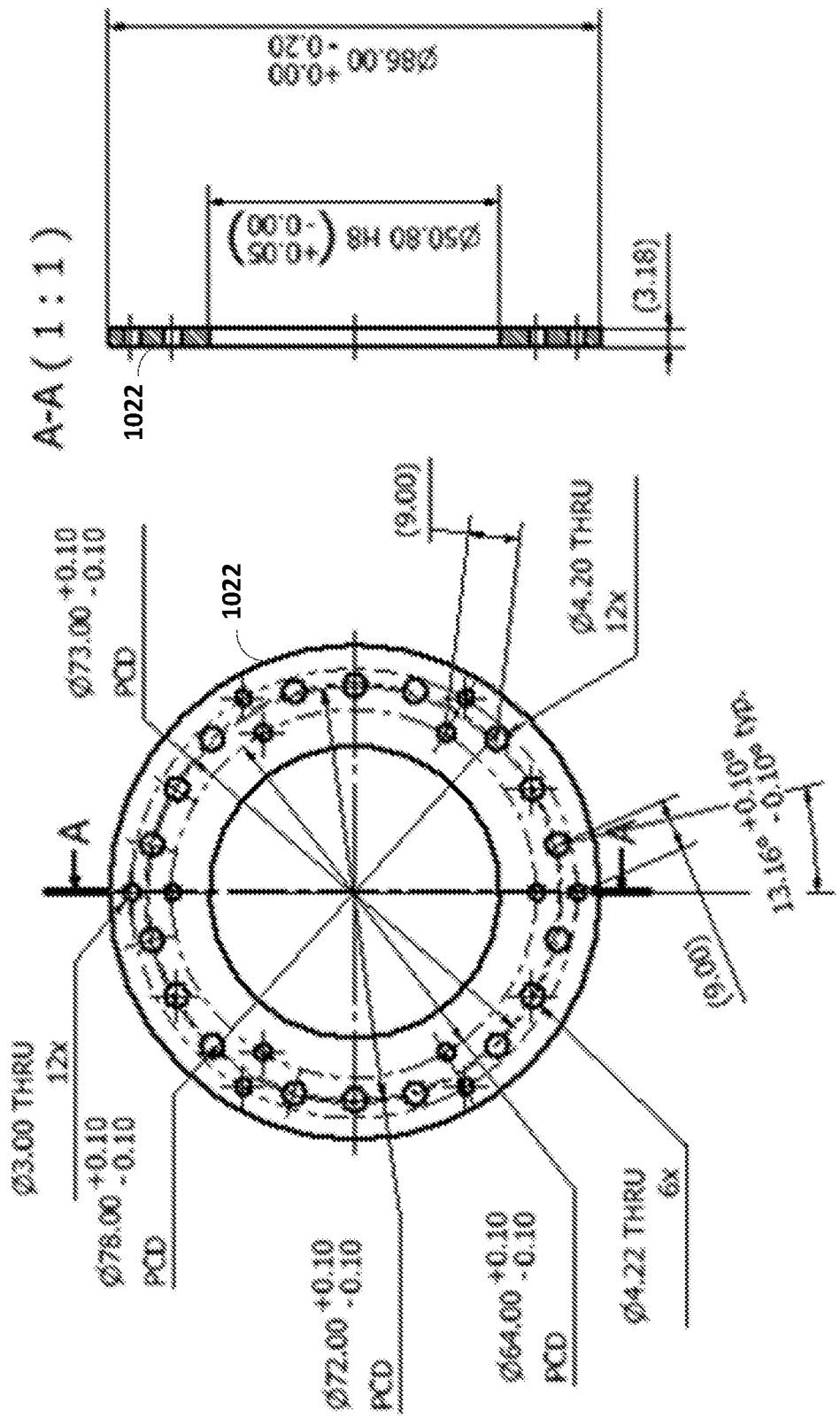
FIG. 13A is a perspective view of electrically insulating material in the first end portion.
FIG. 13B is a cross-section view of the electrically insulating material in the first end portion.

FIG. 13A is a perspective view of electrically insulating material 1022 in the first end portion 1020. The electrically insulating material 1022 defines the first plurality of apertures of the first end portion 1020. In the example of FIG. 13A, the first plurality of apertures receive the plurality of electrical conductors 1030 as described above in FIG. 11.

FIG. 13B is a cross-section view of the electrically insulating material 1022 in the first end portion 1020.

Figures 14A, 14B:
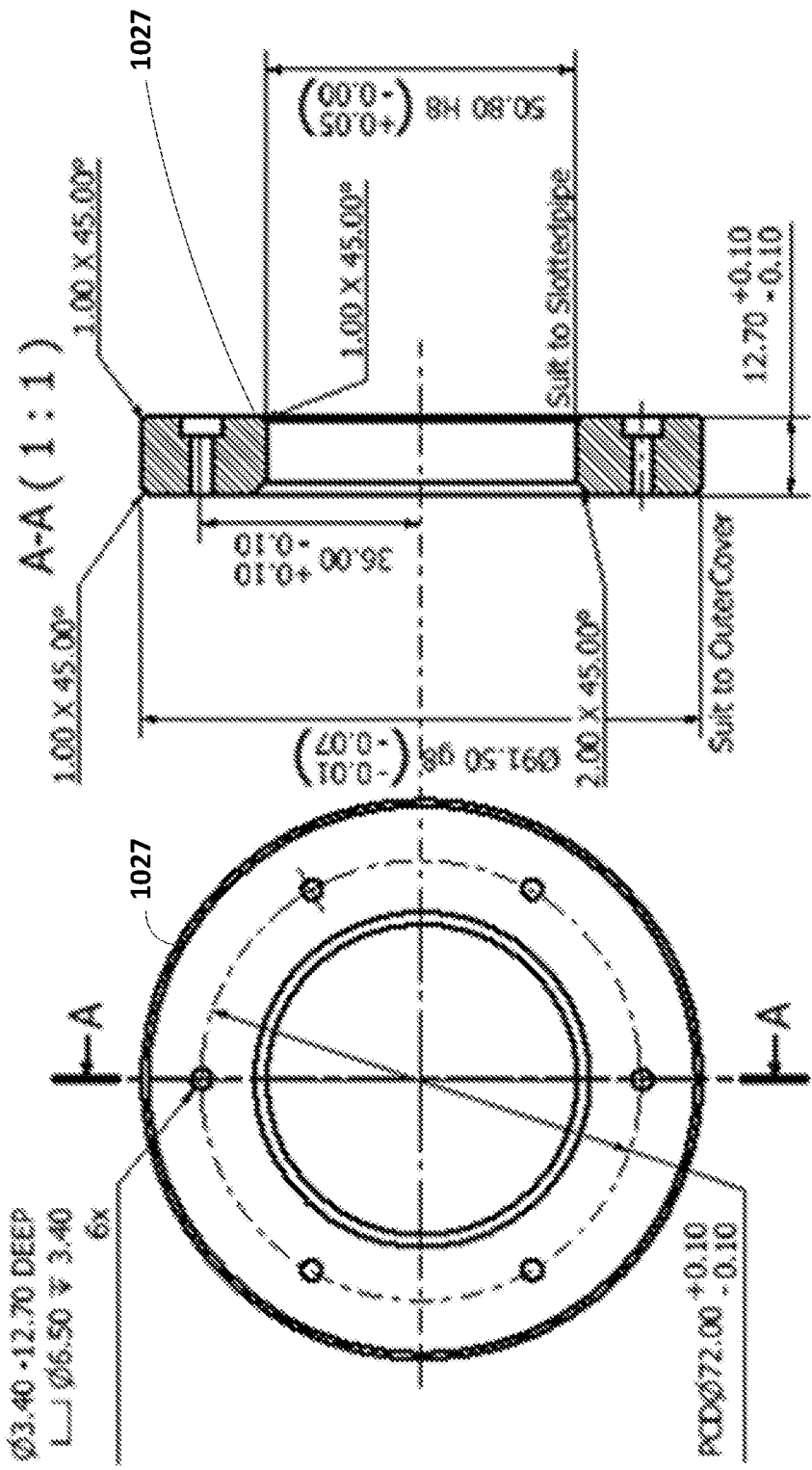
FIG. 14A is a perspective view of end caps for the first and second end portions.
FIG. 14B is a cross-section view of the end caps for the first and second end portions.

FIG. 14A is a perspective view of end caps 1027 in the first and second end portions 1020 and 1025.

FIG. 14B is a cross-section view of the end caps 1027.

Figures 15A, 15B:
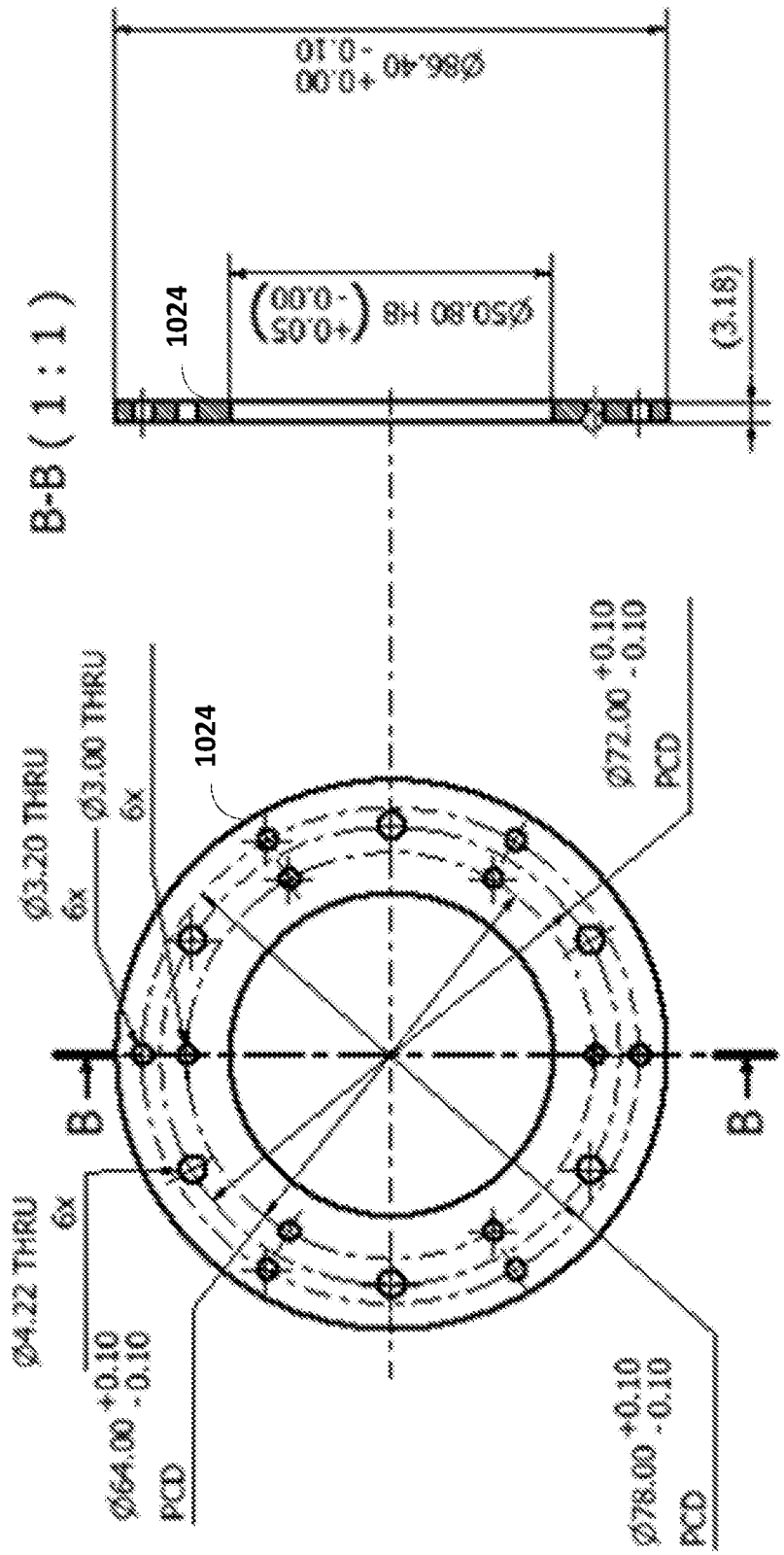
FIG. 15A is a perspective view of electrically insulating material in the second end portion.
FIG. 15B is a cross-section view of the electrically insulating material in the second end portion.

FIG. 15A is a perspective view of electrically insulating material 1024 in the second end portion 1025.

FIG. 15B is a cross-section view of the electrically insulating material 1024.

FIG. 16A is a perspective view of an end cap 1029 in the first end portion 1020 welded to the slotted pipe 1050.

FIG. 16B is a cross-section view of the end cap 1029. In the example of FIG. 16B, the end cap 1029 includes a relief groove for the O-ring 1055 as described above in FIG. 10.

FIG. 16C is a perspective view of the end cap 1029 attached to the slotted pipe 1050 as described above in FIG. 12.

The solid-state transducers of the present disclosure include several advantages over a conventional solid-state transducer. For example, the primary advantage is the reduction or change in the sound/noise produced by an engine or other fluid-flow system. Another advantage may include an increase in the efficiency of an internal combustion engine by reducing backpressure. Another advantage may include the supplement to, or possibly the entire replacement of, a conventional muffler system. Yet another advantage is the relatively low power requirements of the solid-state transducer. Another advantage would be to reduce the size of the air handler in and HVAC system while still providing significant noise reductions or alterations. The advantages of the present disclosure are not limited to the above advantages, but may include other advantages not listed above.

Accordingly, the present disclosure describes a solid-state transducer, a system including a solid-state transducer for active noise control, and a method for operating a solid-state transducer.

What is claimed is:
1. A solid-state transducer comprising:
a housing having a first end and a second end, the housing defining an aperture between the first end and the second end;
a first end portion positioned at the first end of the housing, the first end portion defining a first main aperture and a first plurality of apertures;
a second end portion positioned at the second end of the housing, the second end portion defining a second main aperture and a second plurality of apertures;
a plurality of electrical conductors, wherein a first group of the plurality of electrical conductors is within and extends from one of the first plurality of apertures to the second end portion, and wherein a second group of the plurality of electrical conductors is within and extends from one of the second plurality of apertures to the first end portion; and
a thin-film resistive material disposed between and in electrical communication with the plurality of electrical conductors, the thin-film resistive material configured to
receive one or more electrical signals from the plurality of electrical conductors, and
generate thermal oscillations to create pressure waves in a medium in response to receiving the one or more electrical signals.
2. The solid-state transducer of claim 1, wherein the housing is comprised of a solid high temperature resistant material, and wherein the first end portion and the second end portion are comprised of an electrically insulating material.

3. The solid-state transducer of claim 1, wherein the thin-film resistive material has a heat capacity per unit area of $10^{-3}$ J/m$^2$K or lower, and wherein the thin-film resistive material has a thickness on an order of micrometers or nanometers.

4. The solid-state transducer of claim 1, wherein the thin-film resistive material is a material selected from a group consisting of
carbon nanotube films,
an array of carbon nanotube wires,
porous carbon foams,
freestanding graphene,
graphene on a substrate,
an array of metal nanowires,
nanoscale thickness metal films,
conductive polymer thin films, and
boron nitride nanotubes.

5. The solid-state transducer of claim 1, wherein the first plurality of apertures defined by the first end portion surrounds the first main aperture defined by the first end portion, and wherein the second plurality of apertures defined by the second end portion surrounds the second main aperture defined by the second end portion.

6. The solid-state transducer of claim 5, wherein the first plurality of apertures defined by the first end portion form one or more first concentric rings, and wherein the second plurality of apertures defined by the second end portion form one or more second concentric rings.

7. The solid-state transducer of claim 5, wherein the pressure waves that are generated are at least one of simple plane waves or higher order propagating wave modes.

8. The solid-state transducer of claim 5, wherein the first main aperture is configured to attach to an exhaust pipe of a internal combustion engine or a heating, ventilation, and air conditioning (HVAC) system.

9. The solid-state transducer of claim 1, further comprising an acoustically transparent diaphragm within and extends from the first main aperture to the second main aperture.

10. A system comprising:
an audio amplifier configured to generate one or more electrical signals; and
a solid-state transducer including
a housing having a first end and a second end, the housing defining an aperture between the first end and the second end;
a first end portion positioned at the first end of the housing, the first end portion defining a first main aperture and a first plurality of apertures;
a second end portion positioned at the second end of the housing, the second end portion defining a second main aperture and a second plurality of apertures;
a plurality of electrical conductors, wherein a first group of the plurality of electrical conductors is within and extends from one of the first plurality of apertures to the second end portion, and wherein a second group of the plurality of electrical conductors is within and extends from one of the second plurality of apertures to the first end portion; and
a thin-film resistive material disposed between and in electrical communication with the plurality of electrical conductors, the thin-film resistive material configured to
receive the one or more electrical signals from the plurality of electrical conductors, and
generate thermal oscillations to create pressure waves in a medium in response to receiving the one or more electrical signals.

11. The system of claim 10, further comprising:
an input sensor configured to
measure acoustic noise entering the solid-state transducer, and
output a measurement signal indicative of the acoustic noise that is measured; and
an electronic controller communicatively connected to the input sensor and the audio amplifier, the electronic controller configured to
receive the measurement signal, and
control acoustic waves exiting the solid-state transducer by controlling the audio amplifier to generate the one or more electrical signals based on the measurement signal.

12. The system of claim 11, wherein the input sensor is a sensor selected from a group consisting of:
a microphone,
a pressure sensor,
an accelerometer, and
a tachometer.

13. The system of claim 10, wherein the housing is comprised of a solid high temperature resistant material, and wherein the first end portion and the second end portion are comprised of an electrically insulating material.

14. The system of claim 10, wherein the thin-film resistive material has a heat capacity per unit area of $10^{-3}$ J/m$^2$K or lower, and wherein the thin-film resistive material has a thickness on an order of micrometers or nanometers.

15. The system of claim 10, wherein the thin-film resistive material is a material selected from a group consisting of
carbon nanotube films,
an array of carbon nanotube wires,
porous carbon foams,
freestanding graphene,
graphene on a substrate,
an array of metal nanowires,
nanoscale thickness metal films,
conductive polymer thin films, and
boron nitride nanotubes.

16. The system of claim 10, wherein the first plurality of apertures defined by the first end portion surrounds the first main aperture defined by the first end portion, and wherein the second plurality of apertures defined by the second end portion surrounds the second main aperture defined by the second end portion.

17. The system of claim 16, wherein the first plurality of apertures defined by the first end portion form one or more first concentric rings, and wherein the second plurality of apertures defined by the second end portion form one or more second concentric rings.

18. The system of claim 10, further comprising an acoustically transparent diaphragm within and extends from the first main aperture to the second main aperture.

19. The system of claim 10, wherein the first main aperture is configured to attach to an exhaust pipe of an internal combustion engine or a heating, ventilation, and air conditioning (HVAC) system.

20. A method for operating a solid-state transducer, the method comprising:
generating, with an audio amplifier, one or more electrical signals;
receiving, with a plurality of electrical conductors of the solid-state transducer, the one or more electrical signals from the audio amplifier;

receiving, with a thin-film resistive material of the solid-state transducer, the one or more electrical signals from the plurality of electrical conductors; and generating, with the thin-film resistive material, thermal oscillations to create pressure waves in a medium in response to receiving the one or more electrical signals, wherein the solid-state transducer includes
- a housing having a first end and a second end, the housing defining an aperture between the first end and the second end;
- a first end portion positioned at the first end of the housing, the first end portion defining a first main aperture and a first plurality of apertures;
- a second end portion positioned at the second end of the housing, the second end portion defining a second main aperture and a second plurality of apertures;
- wherein a first group of the plurality of electrical conductors is within and extends from one of the first plurality of apertures to the second end portion,
- wherein a second group of the plurality of electrical conductors is within and extends from one of the second plurality of apertures to the first end portion, and
- wherein the thin-film resistive material is disposed between and in electrical communication with the plurality of electrical conductors.

* * * * *